United States Patent
Martinez et al.

(10) Patent No.: US 10,013,326 B2
(45) Date of Patent: Jul. 3, 2018

(54) PROPAGATING A PREFETCHING PROFILE BIT FROM A PREFETCH QUEUE TO A DATA CACHE TO INDICATE THAT A LINE WAS PREFETCHED IN RESPONSE TO AN INSTRUCTION WITHIN A CODE REGION

(75) Inventors: Raul Martinez, Barcelona (ES); Enric Gibert Codina, Barcelona (ES); Pedro Lopez, Barcelona (ES); Marti Torrents Lapuerta, Barcelona (ES); Polychronis Xekalakis, Barcelona (ES); Georgios Tournavitis, Barcelona (ES); Kyriakos A. Stavrou, Barcelona (ES); Demos Pavlou, Barcelona (ES); Daniel Ortega, Barcelona (ES); Alejandro Martinez Vicente, Barcelona (ES); Pedro Marcuello, Barcelona (ES); Grigorios Magklis, Barcelona (ES); Josep M. Codina, Barcelona (ES); Crispin Gomez Requena, Barcelona (ES); Antonio Gonzalez, Barcelona (ES); Mirem Hyuseinova, Barcelona (ES); Christos Kotselidis, Barcelona (ES); Fernando Latorre, Barcelona (ES); Marc Lupon, Barcelona (ES); Carlos Madriles, Barcelona (ES)

(73) Assignee: Intel Corporation, Santa Clara, CA (US)

(*) Notice: Subject to any disclaimer, the term of this patent is extended or adjusted under 35 U.S.C. 154(b) by 573 days.

(21) Appl. No.: 13/993,054

(22) PCT Filed: Dec. 29, 2011

(86) PCT No.: PCT/US2011/067866
§ 371 (c)(1),
(2), (4) Date: Jun. 10, 2013

(87) PCT Pub. No.: WO2013/101079
PCT Pub. Date: Jul. 4, 2013

(65) Prior Publication Data
US 2013/0332705 A1    Dec. 12, 2013

(51) Int. Cl.
G06F 11/30     (2006.01)
G06F 11/34     (2006.01)
G06F 12/0862   (2016.01)

(52) U.S. Cl.
CPC ...... *G06F 11/3037* (2013.01); *G06F 11/3409* (2013.01); *G06F 11/3466* (2013.01);
(Continued)

(58) Field of Classification Search
CPC .......... G06F 2009/45591; G06F 9/00–9/3897; G06F 11/3409; G06F 11/3466;
(Continued)

(56) References Cited

U.S. PATENT DOCUMENTS 6,233,678 B1 * 5/2001 Bala .................... G06F 11/3612
                                                  712/239
7,308,564 B1 * 12/2007 Jenkins, IV .......... G06F 11/348
                                                  712/227

(Continued)

FOREIGN PATENT DOCUMENTS

JP    2009-080583    4/2009
KR    10-2011-0013182    2/2011

OTHER PUBLICATIONS

IA-32 Intel® Architecture Software Developer's Manual vol. 3: System Programming Guide; Sep. 2005; pp. A-1 to A-68.*
(Continued)

*Primary Examiner* — Keith E Vicary
(74) *Attorney, Agent, or Firm* — Nicholson De Vos Webster & Elliott, LLP

(57) ABSTRACT

A combination of hardware and software collect profile data for asynchronous events, at code region granularity. An exemplary embodiment is directed to collecting metrics for prefetching events, which are asynchronous in nature. Instructions that belong to a code region are identified using (Continued)

one of several alternative techniques, causing a profile bit to be set for the instruction, as a marker. Each line of a data block that is prefetched is similarly marked. Events corresponding to the profile data being collected and resulting from instructions within the code region are then identified. Each time that one of the different types of events is identified, a corresponding counter is incremented. Following execution of the instructions within the code region, the profile data accumulated in the counters are collected, and the counters are reset for use with a new code region.

18 Claims, 7 Drawing Sheets

(52) U.S. Cl.
CPC ...... *G06F 12/0862* (2013.01); *G06F 2201/86* (2013.01); *G06F 2201/865* (2013.01); *G06F 2201/88* (2013.01); *G06F 2201/885* (2013.01)

(58) Field of Classification Search
CPC ............. G06F 12/0862; G06F 2201/86; G06F 2201/865; G06F 2201/88; G06F 11/3037; G06F 2201/885
USPC ........................................................ 712/227
See application file for complete search history.

(56) References Cited

U.S. PATENT DOCUMENTS

| | | | |
|---|---|---|---|
| 7,424,705 | B2 | 9/2008 | Lewis et al. |
| 7,814,466 | B2* | 10/2010 | Chen .................. G06F 11/3466 712/227 |
| 2007/0011492 | A1* | 1/2007 | Swaine ............... G06F 11/3644 714/35 |
| 2009/0259830 | A1* | 10/2009 | Indukuru .............. G06F 9/3802 712/227 |
| 2012/0167058 | A1 | 6/2012 | Condina et al. |

OTHER PUBLICATIONS

PCT International Search Report for PCT Counterpart Application No. PCT/US2011/067866, 3 pgs., (dated Jun. 25, 2012).

PCT Written Opinion of the International Searching Authority for PCT Counterpart Application No. PCT/US2011/067866, 5 pgs., (dated Jun. 25, 2012).

PCT Notification concerning Transmittal of International Preliminary Report on Patentability (Chapter I of the Patent Cooperation Treaty) for PCT Counterpart Application No. PCT/US2011/067866, 7 pgs., (dated Jul. 10, 2014).

Ebrahimi, Eiman, et al., "Coordinated Control of Multiple Prefetchers in Multi-Core Systems", Microarchitecture, 2009. MICRO-42. 42nd Annual IEEE/ACM International Symposium, Dec. 12-16, 2009.

Srinath, Santhosh, et al., "Feedback Directed Prefetching: Improving the Performance and Bandwidth-Efficiency of Hardware Prefetchers", High Performance Computer Architecture, HPCA 2007, IEEE 13th International Symposium on DOI, 2007.

Lee, Chang Joo, et al., "Prefetch-Aware DRAM Controllers", Microarchitecture, MICRO-41. 2008 41st IEEE/ACM International Symposium on DOI, 2008.

Flores, Antonio, et al., "Energy-Efficient Hardware Prefetching for CMPs using Heterogeneous Interconnects", Parallel, Distributed and Network-Based Processing (PDP), 8th Euromicro International Conference on DOI, 2010.

Byna, et al., "Taxonomy of Data Prefetching for Multicore Processors", J. of Computer Science and Technology, 24(3): 405-417 May 2009.

* cited by examiner

PROPAGATING A PREFETCHING PROFILE BIT FROM A PREFETCH QUEUE TO A DATA CACHE TO INDICATE THAT A LINE WAS PREFETCHED IN RESPONSE TO AN INSTRUCTION WITHIN A CODE REGION

CROSS-REFERENCE TO RELATED APPLICATIONS

This patent application is a U.S. National Phase Application under 35 U.S.C. § 371 of International Application No. PCT/US2011/067866, filed Dec. 29, 2011, entitled PROFILING ASYNCHRONOUS EVENTS RESULTING FROM THE EXECUTION OF SOFTWARE AT CODE REGION GRANULARITY.

TECHNICAL FIELD

One or more exemplary embodiments discussed herein are generally directed to collecting profile information, and more specifically, are directed to collecting profile information in regard to instructions that are within one or more code regions of a software program.

BACKGROUND ART

Central processing unit (CPU) speeds have increased at a much faster rate than dynamic random access memory (DRAM) speeds. While static random access memory (SRAM) speed has generally kept up with the improvement in CPU speed, the cost of SRAM is substantially greater than that of DRAM. To address this problem, data can be loaded into a cache, so that the data are available when needed by the CPU. While it is now common to employ a cache to reduce the latency for data accessed by a CPU, the CPU can often experience delays while waiting for required data that are not in the cache to be accessed from memory and placed in the cache in response to memory requests.

Data prefetching can reduce this latency problem by loading data into the cache before and in anticipation of a memory request being made for the data by the CPU. However, prefetching can also cause problems if not efficiently implemented. For example, if prefetching loads data into the cache that will not be used by the CPU, the unneeded data can waste cache capacity, preventing data that will be needed from being loaded into the cache, or the prefetched data may displace data in the cache that are being used by the CPU (known as "cache pollution"). Also, if the data are prefetched and cached too early (causing a "capacity miss" because the prefetched data are displaced before a memory request for the data is made), or if the prefetching technique fetches the data too late or even fails to load data that will be needed by the CPU (both resulting in a "cache miss"), the efficiency with which memory requests are filled will be adversely affected.

Although prefetching mechanisms are beneficial in reducing memory latency problems for many applications, the increase in performance provided by prefetching can be greatly reduced, or the use of prefetching techniques can even result in a loss in performance, compared with a system that does not use prefetching mechanisms. This lower than expected performance can result from the interference caused by requests made by a prefetching engine, in regard to the shared resources employed by an application for satisfying normal memory requests. The problem is especially noticeable when prefetching is performed for a plurality of cores in a chip multiprocessor (CMP) where demand and prefetch requests made by different cores can interfere with each other. This potential negative effect has led to microprocessor designs where prefetch techniques are employed that behave with a restrained aggressiveness and use only easily predictable patterns. As a result, the full benefit of prefetching may not be achieved.

A number of techniques have been proposed to better handle the different memory requests made in modern computing systems by differentiating between demand and prefetching requests that use several shared resources (especially caches, but also queues of the various memory components, on-chip interconnect, memory controller, etc.), so as to treat them in a different manner. In many of these proposals, this differentiated treatment is handled dynamically, taking into account runtime information on the behavior of the prefetch requests and their interaction with other memory requests.

To more effectively fine tune the prefetching techniques employed in a specific application, it can be useful to collect various metrics, such as accuracy, lateness, and cache pollution, which define how well prefetching is performing. These statistics are usually obtained using a phase/interval-based profiling technique. Data related to prefetching events are collected during a specific interval of time. At the end of this interval, the desired metrics are computed, and the information gathered is used to select a behavior or configuration modification for the prefetching hardware structures being employed, which will be applied during the next interval of time.

The kind of phase/interval prefetching profiling information that has previously been obtained, apart from having a coarse granularity, would be of little use for systems such as Dynamic Binary Translators, just-in-time (JIT) compilers, or regular compilers, etc., where it would be desirable to employ the profiling information to generate better code or to dynamically modify the behavior of specific hardware components (dynamic memory management techniques, or prefetching throttling, for example) by inserting in the code, directives or hints to the hardware. More useful information might be obtained with instruction level profiling. However, in the case of prefetching statistics, this type of profiling would require quite complex hardware support, especially given the asynchronous nature of the kind of metrics desired, with respect to the memory execution that triggers prefetching. Moreover, for the purpose of applying compiler directed optimizations, it is not necessary to have prefetching statistics associated with specific instructions, but instead, to associate the statistics with specific code regions. The mechanism used for phase/interval prefetching profiling is incapable of collecting prefetching profile information related to asynchronous events, at the finer code region level of granularity.

Accordingly, it would be desirable to collect prefetching profiling data at a code region granularity. The resulting finer grain profiling data would be more useful for binary optimization of prefetching compared to profile data collected for a phase/interval, as noted above. It would also be desirable to employ relatively simple hardware and minimal software overhead to collect prefetching profiling data. This same approach that is used for prefetching profiling at the code region level of granularity might also be employed for collecting profiling data for other types of asynchronous operations.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 5A:
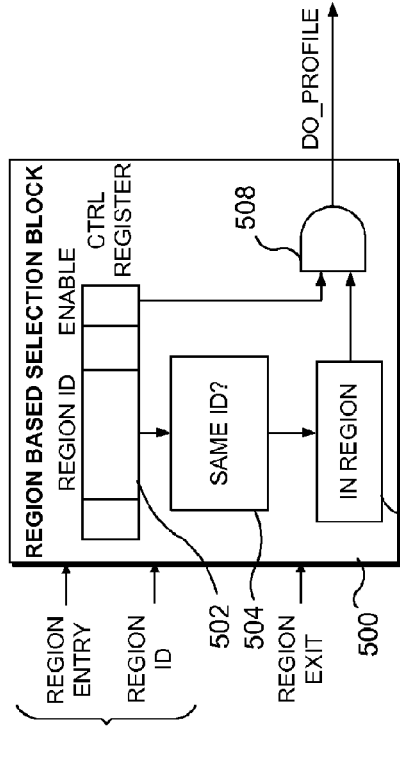
Figure 5B:
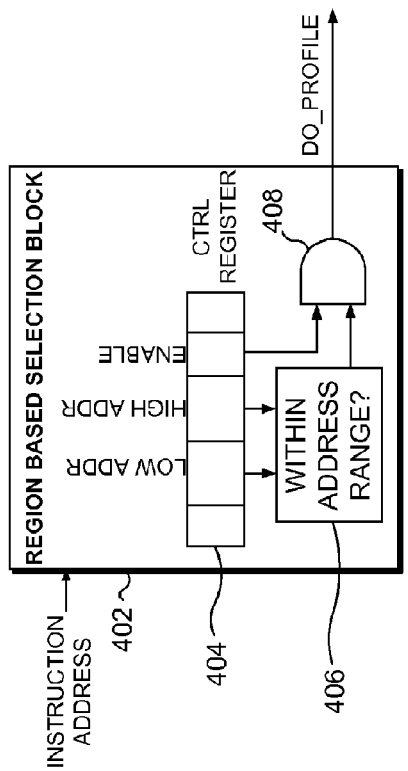
Figure 5C:
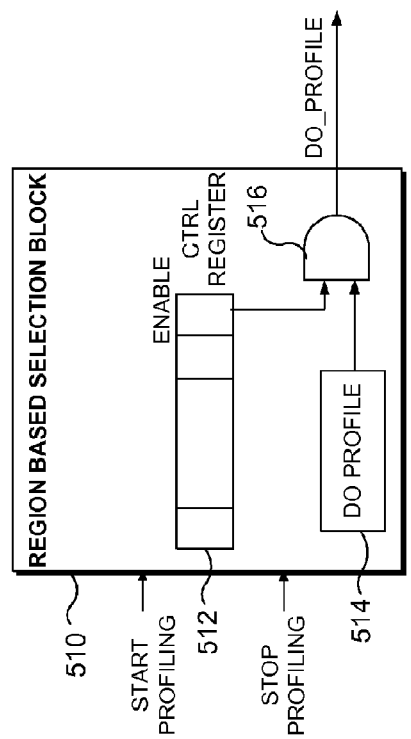
Figure 6:
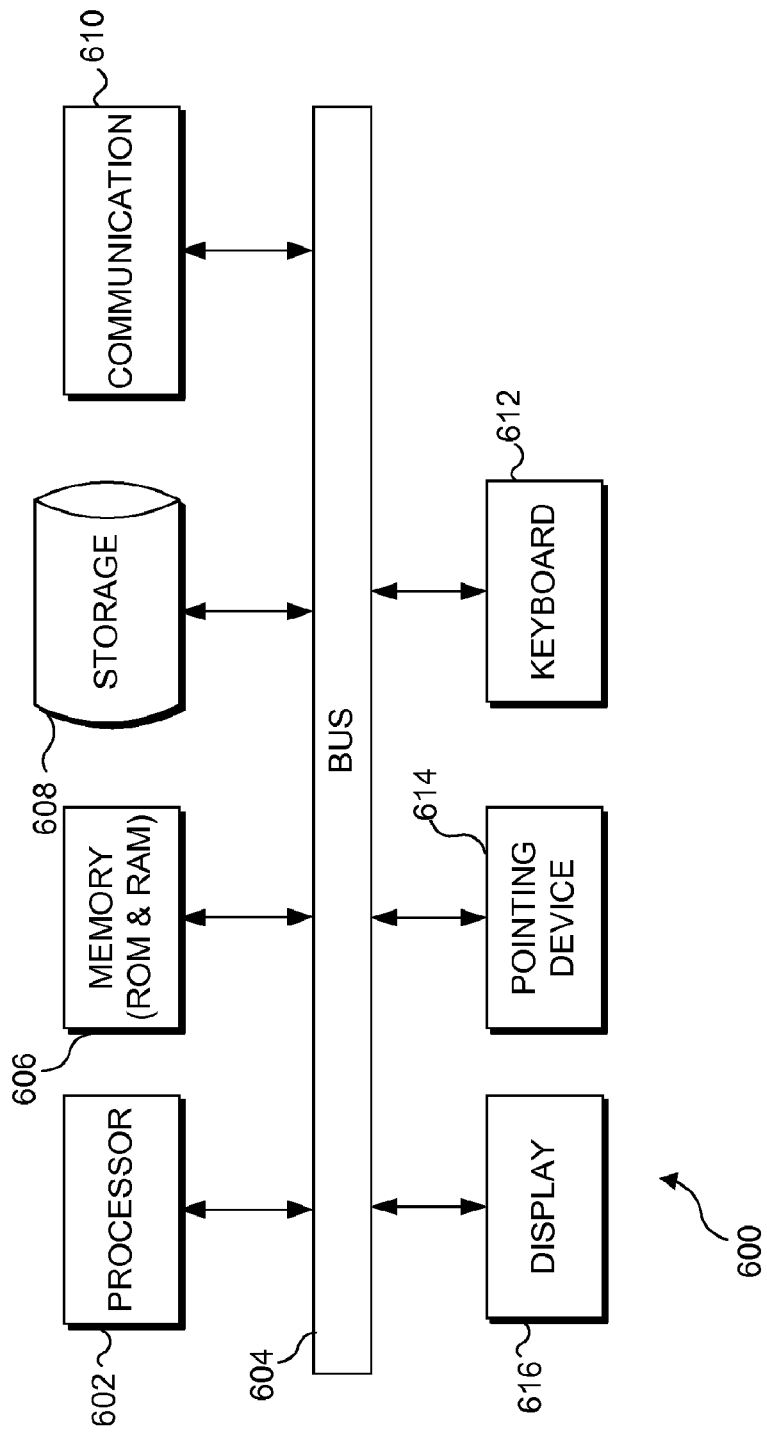
Figure 7:
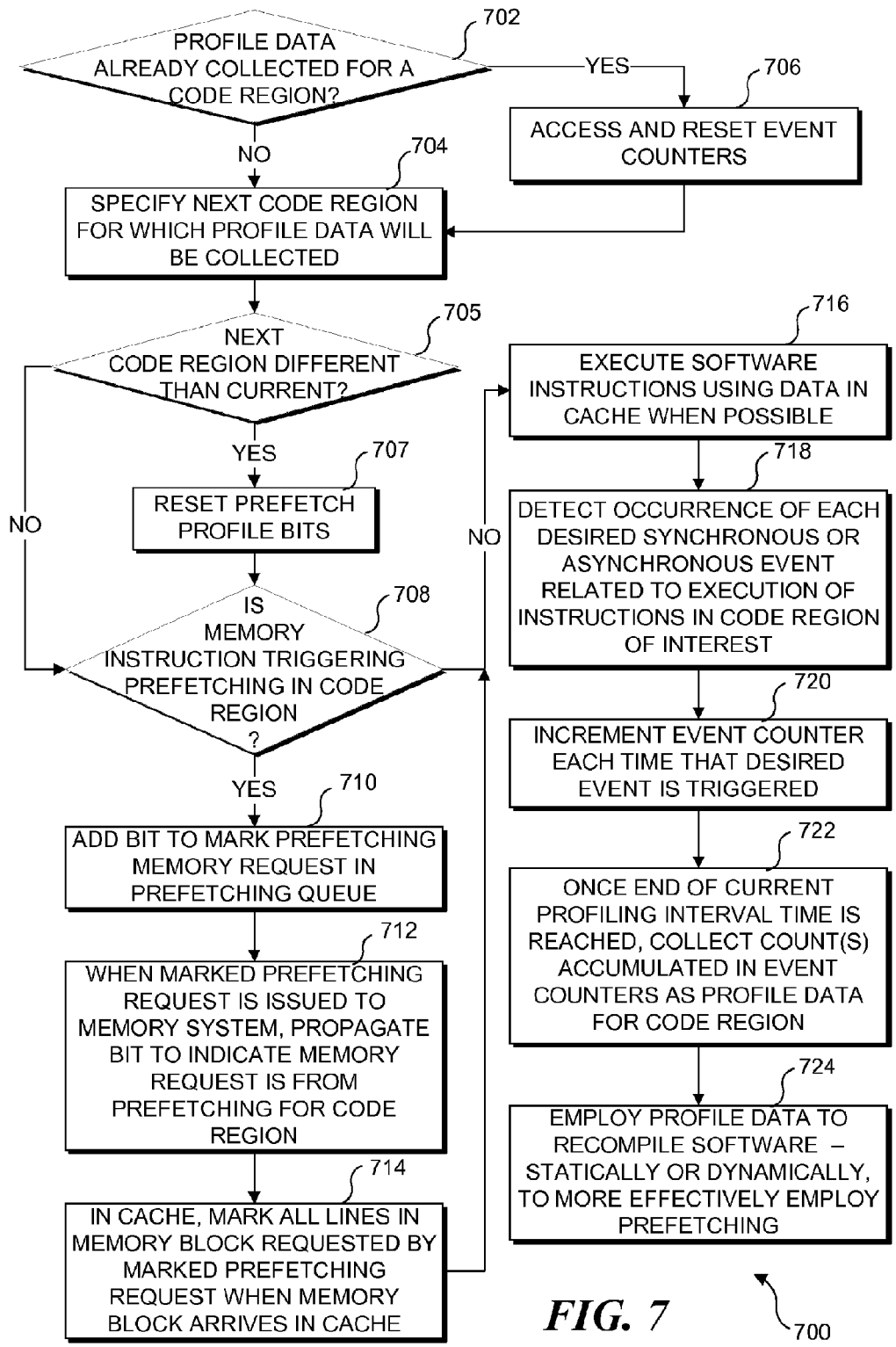

FIGS. 5A, 5B, and 5C illustrate three different exemplary approaches for identifying software instructions that belong to a specific code region;

FIG. 6 is a schematic block diagram illustrating an exemplary computer system on which embodiments of the present approach for collecting profile information can be implemented; and FIG. 7 is a flowchart illustrating exemplary logic for collecting profile data in regard to asynchronous events.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Figure 1:
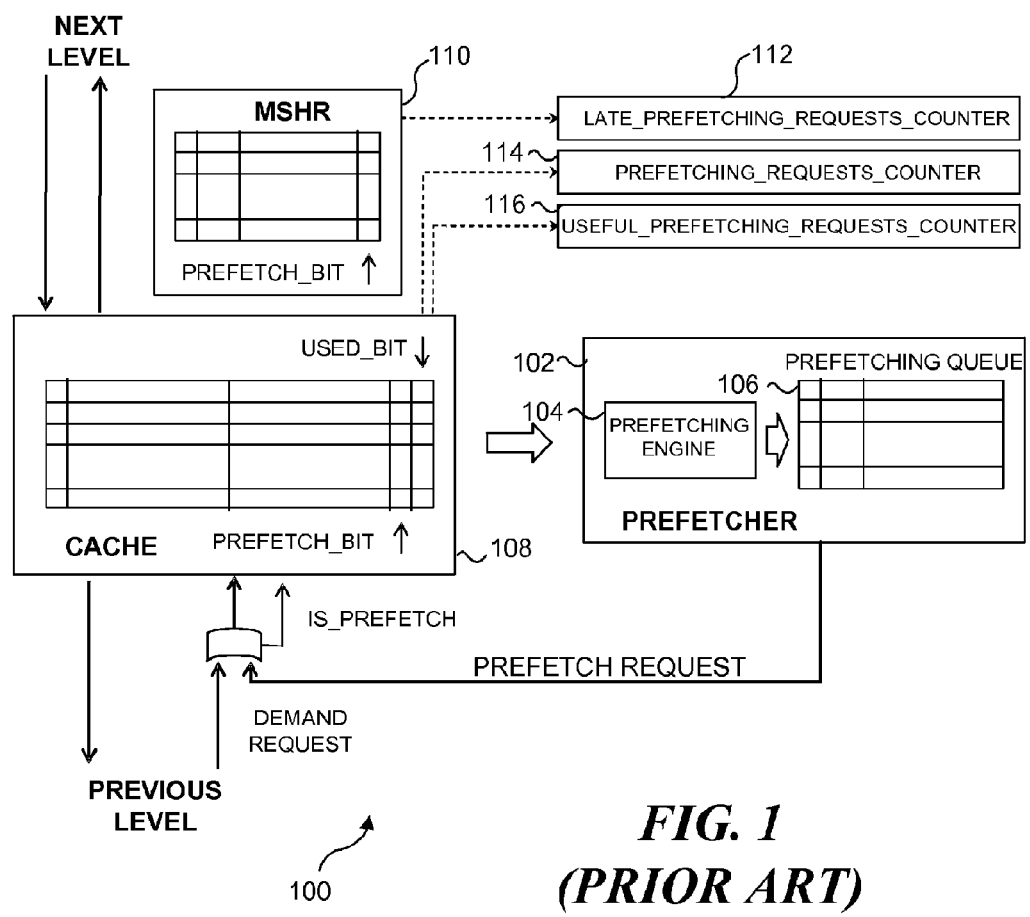
FIG. 1 (Prior Art) is a schematic block diagram illustrating a known mechanism for collecting prefetch profiling data such as accuracy and lateness metrics, at a phase/interval based level.

FIG. 1 (Prior Art) illustrates a typical mechanism 100 that has previously been used for collecting prefetching performance statistics during a phase/interval. In this known technique, a prefetcher 102 includes a prefetching engine 104 that loads a prefetching queue 106 with prefetch memory requests. If the requested data are already available in the cache when a prefetching request is issued, the request is discarded. If not, the prefetch memory requests are used to retrieve data from the main memory that are loaded into a cache 108, where each prefetched line of data is marked with a prefetch_bit to indicate the specific data that were prefetched from memory. If the prefetched data are used by the processor, a used_bit is set. A miss status holding register (MSHR) 110 (or similar structure) keeps track of the memory requests that have missed in the current cache level and are in-flight, which means that those memory requests are going to higher levels in the memory hierarchy to obtain the requested data. Each of these in-flight requests is marked with a bit that indicates whether the request is a regular demand request or a prefetching request. When the requested data arrive, the data are stored in the cache, and this marker bit is also stored, as described above. If a data demand requesting access to a line that has already been requested to be prefetched arrives at the MSHR, the prefetching is considered to be late, the corresponding prefetching event is raised, and the prefetching bit of the MSHR for that line is cleared.

The profiling information that is obtained for a phase/interval in this example include: (a) the number of times that the data were prefetched too late to be used, which is accumulated by a late_prefetching_requests_counter 112, using the MSHR; (b) the total number of prefetch memory requests that were issued during the phase/interval, as determined by the count of data with the prefetch_bit set accumulated by a prefetching_requests_counter 114; and, (c) the accumulated count of the prefetched data lines in cache 108, that were used, based on the accumulated count by a useful_prefetching_requests_counter 116. Again, it is emphasized that this prior approach is not able to collect profile data for asynchronous events, on a code region level of granularity.

Figure 2:
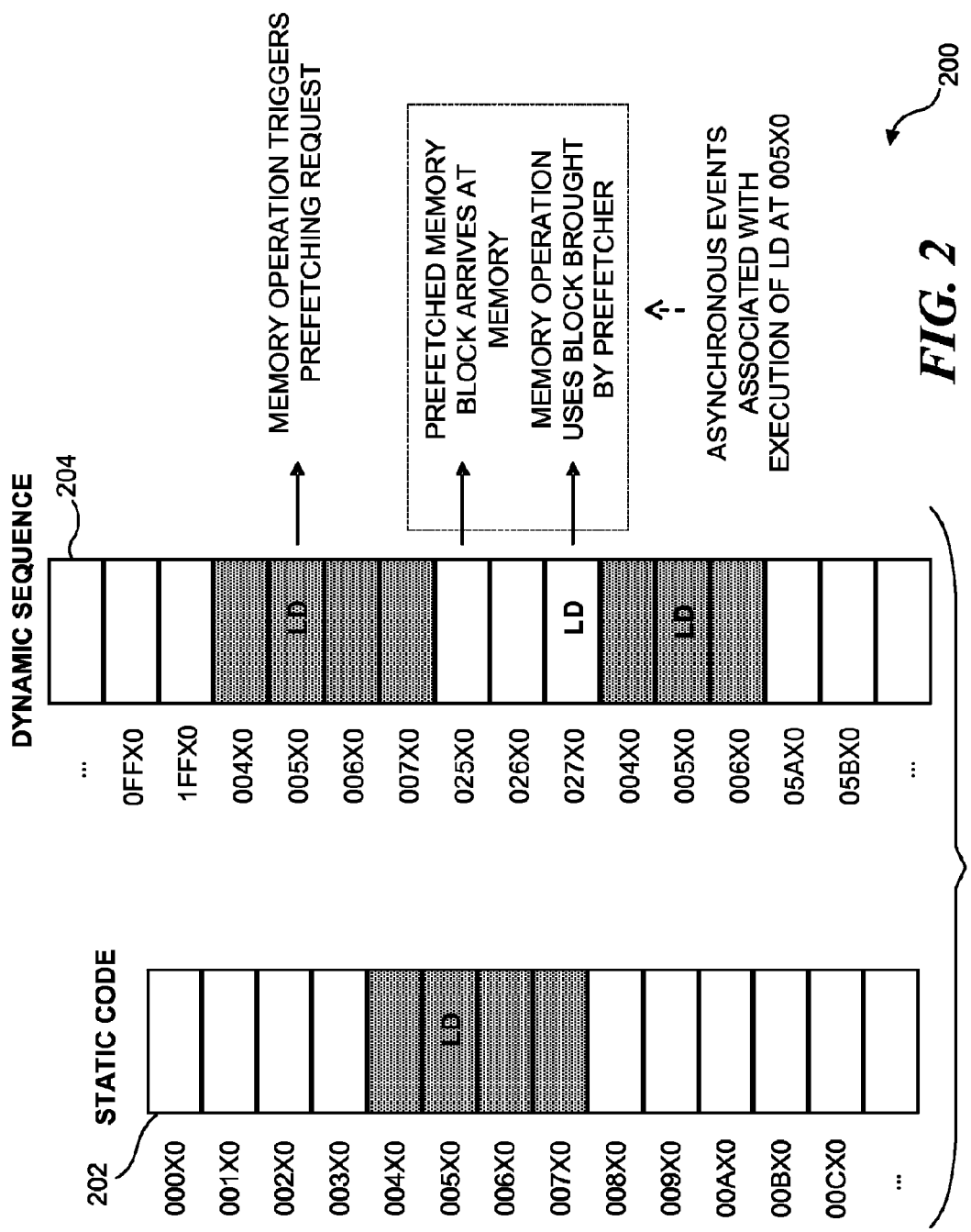
FIG. 2 is a schematic diagram showing exemplary static code, and a corresponding dynamic sequence that illustrates asynchronous events related to prefetching in response to instructions within a code region.

FIG. 2 illustrates an example 200 of asynchronous events associated with prefetching. A static code sequence 202 is shown in which a load (LD) instruction occurs at address 005X0. In a corresponding dynamic sequence 204, the LD memory instruction at 005X0 triggers a prefetching memory request. Consequently, at 0025X0, the prefetched memory block arrives at the cache memory, and at 027X0, a LD instruction causes a memory operation that uses the data block prefetched by the prefetcher. Thus, the two events at 025X0 and at 027X0 are asynchronous events that are associated with the execution of the LD instruction at 005X0.

Figure 3:
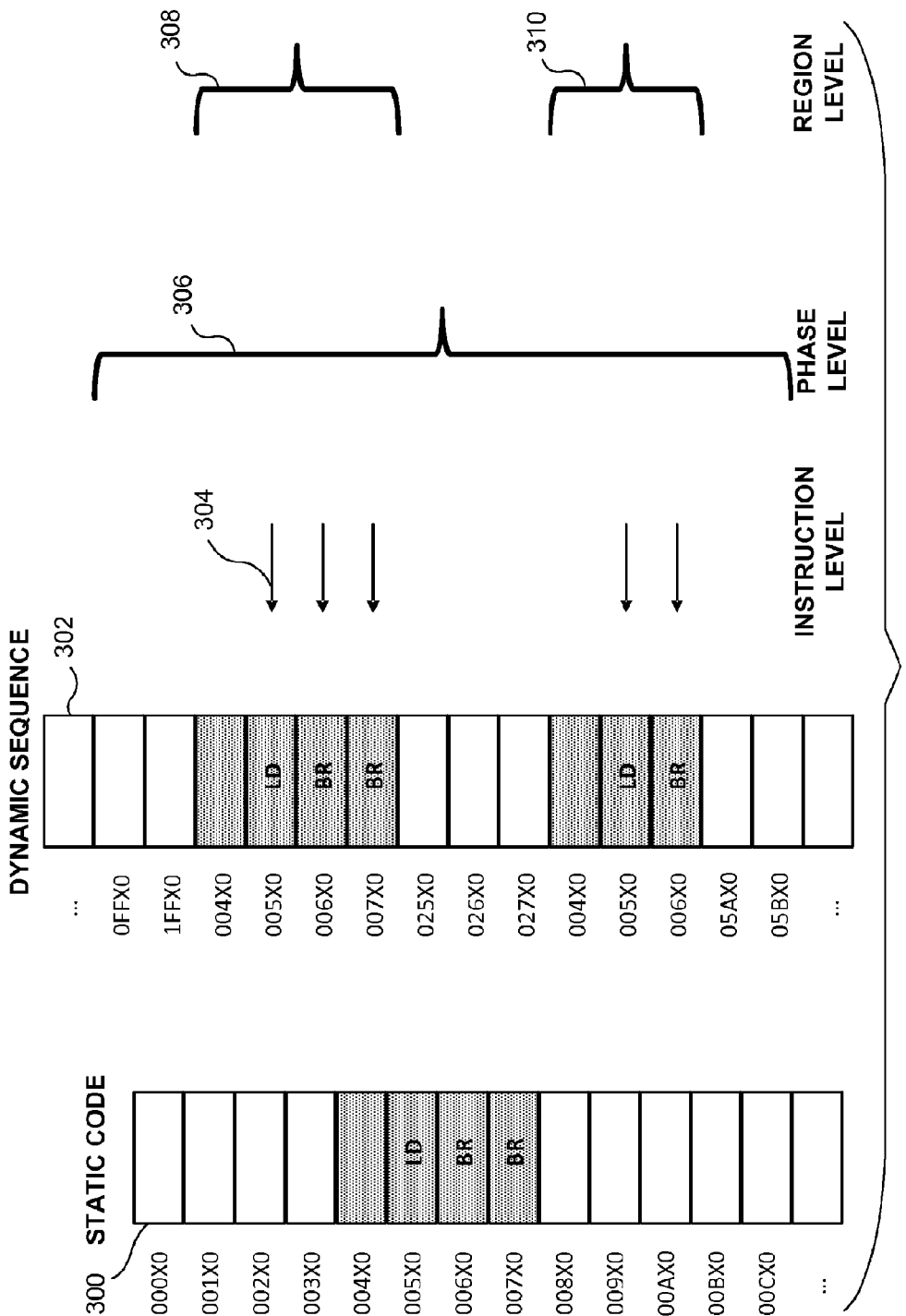
FIG. 3 is a schematic diagram showing exemplary static code with a corresponding dynamic sequence and indicating different levels of granularity for which profile data might be collected, including an instruction level, a phase level, and a code region level.

As noted above, it is not necessary to collect profile data for prefetching on an instruction level. Instead, a compiler can effectively work toward optimizing prefetching based on profile data metrics obtained at a code region level of granularity. FIG. 3 illustrates three different levels of granularity for a dynamic sequence 302 that corresponds to a static code sequence 300. Note that the example presented in this Figure is related to the profiling of synchronized events associated with LD and branch (BR) instructions. An instruction level of granularity 304 is illustrated, where a LD instruction occurs at 005X0, and BR instructions occur at 006X0, and 007X0. The broadest level of granularity illustrated in this example is a phase level 306, which encompasses 0FFX0 through 05BX0. In contrast, the present approach collects profile data for events resulting from instructions at a code region level of granularity, such as the execution of the static instructions from 004X0 through 007X0, at 308 and 310.

Overview

Figure 4:
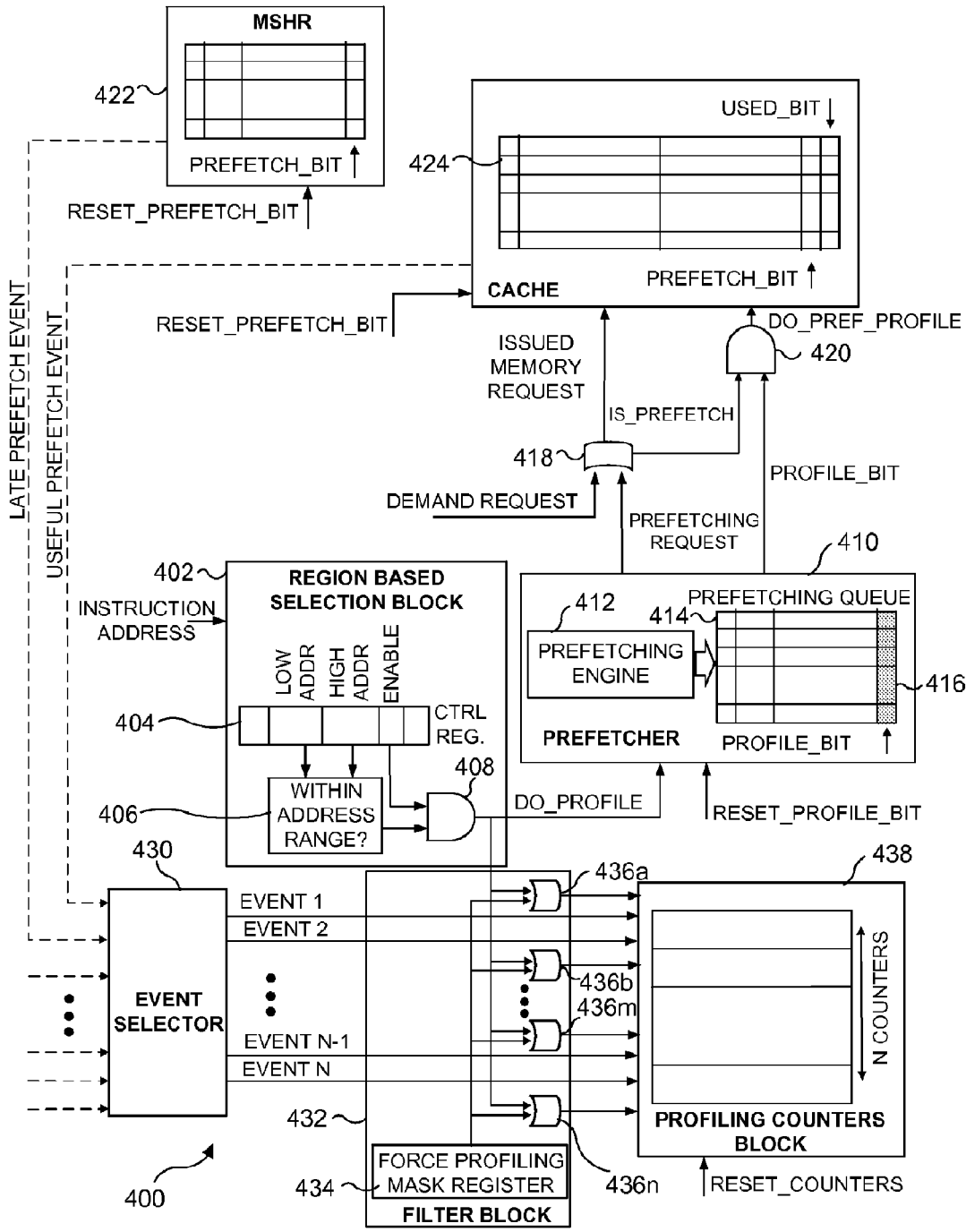
FIG. 4 is a block diagram of an exemplary hardware system for collecting asynchronous profile data at a code region level of granularity.

The present approach for collecting profile data at a code region level of granularity is implemented using an exemplary hybrid hardware/software mechanism, such as shown in a schematic block diagram 400 illustrated in FIG. 4. This Figure shows an example of a general case in which synchronous and asynchronous events related to prefetching are profiled at a code region level. The same mechanism discussed herein would enable profiling another set of events at the interval/phase level of granularity, at the same time. A key aspect of this mechanism is that it filters out events so that they are not included in the profile data being collected, if the events result from instructions that are not within a desired code region. Accordingly, this approach includes a region based selection block 402 that evaluates instructions based on their address. While alternative exemplary embodiments are discussed below in regard to mechanisms for determining if instructions are within a selected/desired code region, in this example, the code region is defined by a low address and a high address for the code region that are included in a control register 404 within the region based selection block. Instruction addresses are evaluated in a block 406 to determine if an instruction is within the target code region by determining if the address for the instruction is within the range defined by the low address and the high address of the desired code region. If so, and if an enable bit is then provided by control register 404, an AND gate 408 provides a DO_PROFILE signal to indicate that the instruction currently being evaluated is within the desired code region. The DO_PROFILE signal is input to a prefetcher 410 and to a filter block 432. If the instruction is a software prefetcher instruction or a memory operation that triggers prefetching engine 412 to generate one or more prefetching requests, the resulting requests are placed in a prefetching queue 414. Also, if the DO_PROFILE signal indicates that the prefetching request resulted from an instruction that is within the desired code region, a profile_bit 416 is applied to the prefetch instruction placed in the prefetching queue, to serve as a marker.

Prefetcher 410 is continually monitoring memory accesses by the processor, searching for predictable patterns, and eventually generates prefetching requests in response to specific memory operations that trigger prefetching engine 412. These prefetching requests are stored in prefetching queue 414 and are subsequently submitted to the memory system. Each prefetching request brings memory blocks to a cache 424, potentially evicting existing useful blocks that were already stored there. The prefetched data will be later requested by a regular memory demand request if the prefetching engine was successful in predicting its choice of prefetched data blocks, or will have wasted cache storage space—if not. All these subsequent events, although related to the original memory operation that triggered the prefetching, take place asynchronously with respect to that operation.

A selector 418 is responsible for issuing memory requests to the cache and for arbitrating between demand and prefetch requests if they are waiting to be issued at the same time. When a memory request is issued an AND gate 420 responds to an IS_PREFETCH signal from selector 418 and to a PROFILE_BIT signal that indicates that the first prefetch request to be issued was generated from an instruction in the desired code region being profiled and determines if the request corresponds to a prefetching request for which events are to be tracked and profiled. If the issued request is a prefetching request that lands in the cache, it is discarded. If the data requested is not in the cache, the request is annotated in MSHR 422 by marking it with a PREFETCH_BIT in response to the DO_PREF_PROFILE signal produced by AND gate 420. When the data arrive and are stored in cache 424, the data are marked with a PREFETCH_BIT derived from the marker in MSHR 422. If the data thus stored in cache 424 are used by the processor, a USED_BIT is set. MSHR 422 also keeps track of the prefetched requests that were fulfilled too late to be used by the processor, so that such profile information can be collected in regard to the desired code region. Note that this type of event occurs when a demand request arrives at MSHR 422 for a data block already requested by an in-flight prefetching request. In this case, the PREFETCH_BIT is cleared.

A way of generating prefetching events only for memory requests and memory blocks associated with the prefetching requests triggered by an instruction from a specific code region is described above. In addition to these types of events, it may be desirable to collect profiling statistics related to other events, synchronous or asynchronous, and at a code region and/or interval/phase level of granularity. The exemplary mechanism shown in FIG. 4 enables collecting all of these types of profiling information at the same time in an integrated manner. The first element that makes this capability possible is an event selector 430 that selects from all of the events in the system, a subset of N events that are to be profiled in each interval of time. Each different event 1 through N that occurs produces an input to a profiling counters block 438, which includes N different counters that accumulate successive occurrences of the different types of events of interest, until the counters are reset. A filter 432 discards (or ignores) events that are not desired to be included in the profile information being collected. A force profiling mask register 434 identifies the events being collected and provides signals that are supplied to one input of N different OR gates 436a, 436b, through 436n, where each of the different events has a corresponding OR gate. Another input to these OR gates receives the DO_PROFILE signal output from AND gate 408. If the input from force profiling mask register 434 or the DO_PROFILE signal is a logic level one, then OR gates 436a-436n produce an output signal that enables the corresponding event counter in profiling counters block 438 to be incremented in response to the occurrence of an event that was selected by event selector 430. Note that the corresponding bit on the force profiling mask register 434 will be set to one for asynchronous events collected at code region granularity, which are already filtered because they are only triggered when related to the code region of interest, and also, for events that are desired to be collected at an interval/phase level of granularity (independently thereof, if they are related to an instruction in the code region). On the other hand, this bit will be set to zero for synchronous events that are intended to be profiled at the code region level of granularity. These synchronous events would be filtered when the DO_PROFILE signal is also zero, which indicates an instance of the event that is not associated with instructions in the code region of interest. Once the desired interval of time has expired, the counts accumulated by the event counters in profiling counters block 438 are either stored in more permanent storage, e.g., on a disk drive, for subsequent use, or can be stored and accumulated in system memory to increase the effective capacity of the profiling counters, or can directly (or after several profiling intervals) be used to dynamically modify the prefetching instructions employed, so as to further optimize prefetching for the code region when the instructions in the code region are next executed. The event counters in profiling counters block 438 are reset by a RESET_COUNTERS signal that is input to the block before collecting profile data for the next desired code region of interest. If the next code region of interest is different from the current one, the PREFETCH_BIT on the MSHR and cache entries are also cleared by application of the RESET_PROFILE_BIT signal.

Alternative Exemplary Region Based Selection Blocks

Other exemplary embodiments for determining if an instruction address is within a desired code region are illustrated in FIGS. 5B and 5C. (The approach illustrated in regard to region based selection block 402 shown in FIG. 5A has already been discussed above.) In FIG. 5B, a region based selection block 500 is provided with a region ID (identifier) to identify the desired code region for which profile information is being collected; the region ID is stored in a control register 502. The region based selection block is also provided with an identification of a region entry instruction and a region exit instruction. Each instruction that is within the region (i.e., is between the entry instruction and the exit instruction) is identified as being within the desired code region if it has the same region ID, as determined in a block 504. If the instruction is within the desired code region, a block 506 provides a logic level one to an AND gate 508. When the enable signal from control register 502 is also a logic level one, AND gate 508 produces an output DO_PROFILE signal to indicate that synchronous or asynchronous events resulting from execution of the instruction are to be used for profile information being collected for the desired code region.

FIG. 5C illustrates an exemplary region based selection block 510 that responds to special instructions for starting and stopping the collection of profile information. These special instructions are dynamically inserted by software. A control register 512 provides an enable signal to an AND gate 516. Instructions that are executed after the start profiling special instruction, but before the stop profiling special instruction cause a do profile block 514 to produce a logic level one output. If both the enable signal from control register 512 and the logic level signal from do profile block 514 are at a logic level one, AND gate 516 produces the DO_PROFILE signal to indicate that synchronous or asynchronous events that result from execution of the current instruction, which is between the start and stop profiling special instructions, are to be used when collecting profile information for the desired code region.

Simultaneously Collecting Profile Information for a Plurality of Code Regions

It is contemplated that, at the cost of a higher complexity and hardware costs, profile information can be collected for a plurality of desired code regions at the same time, since any of the above alternative exemplary embodiments for determining whether an instruction is within a desired code region can be applied to make that determination for each of the multiple code regions of interest. It would also be necessary to mark each prefetch request, each entry in the MSHR, each block in the cache, and each event signal not only with a profile prefetch bit, but in addition, with an identifier of the code region in which the instruction giving rise to the event was located. This identifier would thus be used to ensure that profile information being collected is associated with the correct code region. Using n bits for this identifier would enable $2^n$ different code regions to be profiled at the same time. Accordingly, events of interest that result from instructions in each of the multiple desired code regions can readily be identified and accumulated to provide the profiling information for each such code region.

It also should be understood that the desired code region can be a single software instruction, so that the present approach can thus be used to collect profile information at an instruction level of granularity. Further, profile information can simultaneously be collected for multiple single instruction code regions. It is also contemplated that profile information can be collected for relevant events that result from execution of only a subset of $2^n$ instructions in a code region that trigger the prefetcher engine, where n is the number of bits required to mark each prefetch request, entry in intermediate structures, and event signals—just as noted above in the case where profile data are simultaneously collected for a plurality of code regions.

Exemplary Computer System for Collecting Profile Information

FIG. 6 illustrates an exemplary computer system 600 for implementing the collection of profile information for a desired code region. The computer system includes a processor 602 that is coupled in bi-directional communication with a bus 604. The bus is also coupled in bi-directional communication with a memory 606 that includes both read only memory (ROM), and random access memory (RAM) or some other type of dynamic storage for both data and machine executable instructions that are executed by processor 602, and with a non-volatile storage 608, which may include a magnetic or optical storage medium and a corresponding drive. Data and machine executable instructions can be stored on non-volatile storage 608. Computer system 600 implements the exemplary approach described herein to collect profile information in regard to instructions within one or more desired code regions, where events corresponding to the profile information are a result of the instructions being executed—either synchronously or asynchronously relative to the instructions. This computer system is thus useful in collecting profile data regarding prefetching. The profile data collected can be evaluated to optimize prefetching either manually, or dynamically. For example, the profile data can be used by Dynamic Binary Translators, just-in-time (JIT) compilers, or regular compilers to generate more effective code or to dynamically modify the behavior of specific hardware components.

While not required for implementing the present novel approach, a communication module 610 can be included to enable the computer system to communicate with other computing devices or storages over a network, and the communication module may comprise a modem, or an network interface card for coupling to an Ethernet, a token ring, or other type of local area network, or a wide area network, or to the Internet. The communication module enables computer system 600 to upload and/or download data and/or software programs by communicating with other computer systems, or servers, or storage devices.

Bus 604 may also include an input/output bus (not separately shown) for coupling to a display 616 that displays graphics and/or text, a pointing device 614, such as a mouse, trackball, touchpad, or other input device for controlling a cursor and making selections, and a keyboard 612 (or touch screen) for providing input of alphanumeric text and controlling the operation of computer system 600.

Exemplary Flowchart

FIG. 7 is a flowchart 700 illustrating exemplary logic that is implemented to collect prefetching profile information in regard to asynchronous events that occur in response to the execution of instructions within a desired code region. A decision block 702 determines if profile data have previously been collected for a code region. If not, a block 704 indicates the desired code region for which profile data will be collected in the current profiling interval. If the event counters have previously been accumulating profile data for a code region, then a block 706 provides for resetting the event counters before proceeding with block 704. After determining the next code region to be profiled, a decision block 705 determines if the next region is different than the current one, and if so, a block 707 resets the prefetch profile bits of the pertinent structures before continuing to a decision block 708. Otherwise, the logic proceeds directly to decision block 708.

Decision block 708 determines if a memory instruction that is within the current desired code region for which profile data are being collected is triggering prefetching. Again, it should be noted that the present approach is not limited to collecting profile information for prefetching. However, the collection of profile data for prefetching event is discussed in the present example, since this application clearly illustrates the ability of this approach for collecting profile information for asynchronous events. If the response in decision block 708 is affirmative, a block 710 adds a profile bit (as a marker) to the prefetching memory request that is loaded into the prefetching queue. As noted in a block 712, when a prefetching memory request that is thus marked with a bit is issued to the memory system, the marker bit is propagated with the request to indicate that the memory request was in response to a prefetching instruction from the desired code region for which the profile data are being collected. Accordingly, in a block 714, all lines of the memory block that is prefetched and loaded into the cache in response to the executed marked prefetching request are also marked to indicate that they were prefetched in response to a prefetch request from within the desired code region. A block 716 indicates that the processor executes the software instructions of the program being run, using the data in the cache, when possible. Block 716 also applies when the response to decision block 708 is negative, i.e., when a memory instruction triggering prefetching was in response to a prefetch request that was not within the desired code region, bypassing the intervening logic between decision block 708 and block 716.

A block 718 detects the occurrence of each desired event, i.e., each different type of profile information that is to be collected, for those events related to the execution of instructions from the code region of interest. For prefetching profile data, the collected information might include, for example, the total number of late prefetches, and the total count of each prefetch providing data actually used by the processor. However, profile information can also be collected for other types of events. In a block 720, the event counter that is collecting profile data for each different type of event is incremented each time that a desired event relating to a marked prefetching request is detected. A block 722 transfers the count(s) accumulated in the event counter(s) as profile data for the desired code region, once the end of the current profiling interval is reached. The transfer of this data can be to a more permanent storage or to a dynamic compiler that can use the data to improve the prefetching performance. As indicated in a block 724, the profile data that are thus collected can be employed to recompile software, either statically or dynamically, to more effectively employ prefetching.

An advantage of one or more embodiments of the present approach is that profile information can be collected for both synchronous and asynchronous events that result from the execution of instructions in a desired code region. In contrast, the prior approach is generally limited to collecting profile information at a phase/interval level of granularity, or in capturing only profile information related to synchronous events—but not profile information for asynchronous events at a code region level of granularity.

Although the concepts disclosed herein have been described in connection with exemplary embodiments for practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

What is claimed is:

1. A processor comprising:
   (a) a first circuit to indicate whether an instruction that has been fetched by the processor is within a code region for which profile information will be collected, and, if so, to generate a do profile signal;
   (b) an event selector circuit to select an event for which to collect the profile information, and to generate an event occurred signal upon an occurrence of the selected event, the selected event being selected from synchronous events and asynchronous events, the event selector circuit further to enable the collection of profile information at a code region level of granularity and at least one of an interval and phase level of granularity;
   (c) a second circuit to generate an increment event signal in response to the event occurred signal when at least one of the do profile signal and a force profiling signal is asserted;
   (d) a third circuit to update the collected profile information in response to the increment event signal; and
   (e) a prefetcher circuit to generate a prefetching request in response to the instruction that has been fetched, to store the prefetching request in a prefetch queue, and to store a prefetching profile bit in the prefetch queue along with the prefetching request when the do profile signal is asserted, wherein the prefetching profile bit is to be propagated with the prefetching request and stored in a data cache with each line of a memory block requested by the prefetching request to indicate that the line was prefetched in response to an instruction within the code region.

2. The processor of claim 1, wherein the first circuit is to compare an address for the instruction that has been fetched to a low address of the code region and a high address of the code region to determine if the address is within a range bounded by the low address and the high address, and if so, determine that the instruction that has been fetched is within the code region, but if not, determine that the instruction that has been fetched is not within the code region.

3. The processor of claim 1, wherein:
   the first circuit indicates that the instruction that has been fetched is within the code region when the instruction that has been fetched was fetched after a start profiling instruction and before a stop profiling instruction;
   the start and stop profiling instructions having been dynamically inserted by software.

4. The processor of claim 1, the processor further to set a bit in the data cache when accessing each line of the memory block requested by the prefetching request to indicate that the line was used.

5. The processor of claim 4, wherein the third circuit comprises one or more event counters to store the collected profile information while instructions within the code region are being executed.

6. The processor of claim 5, wherein the third circuit resets the one or more event counters before collecting profile information in response to instructions within a new code region.

7. The processor of claim 1, wherein the first circuit indicates whether instructions that have been fetched by the processor are within any of a plurality of different code regions for which profile information is to be collected, the prefetcher circuit then marking each prefetching request generated in response to each fetched instruction that is within any of the plurality of different code regions with an identifier of the code region in which the instruction occurs.

8. A machine implemented method to collect profile information in regard to instructions within a code region, comprising:
   (a) determining whether an instruction that has been fetched is within the code region, and, if so, generating a do profile signal;
   (b) selecting an event for which to collect the profile information, the selected event being selected from synchronous events and asynchronous events, and enabling collection of the profile information at a code region level of granularity and at least one of an interval and phase level of granularity;

(c) detecting the selected event for which to collect the profile information and generating an event occurred signal, where the selected event occurs in response to performing the fetched instruction, and generating an increment event signal in response to the event occurred signal when at least one of the do profile signal and a force profiling signal is asserted;

(d) updating a record for the selected event in response to the increment event signal, wherein the record comprises the collected profile information; and (e) generating a prefetching request in response to the instruction that has been fetched, storing the prefetching request in a prefetch queue, and, when it is determined that the instruction is within the code region, storing a prefetching profile bit in the prefetch queue along with the prefetching request, wherein the prefetching profile bit is to be propagated with the prefetching request and stored in a data cache with each line of a memory block requested by the prefetching request to indicate that the line was prefetched in response to an instruction within the code region.

9. The method of claim 8, wherein the instruction that has been fetched is determined to be within the code region by:
(a) setting a low address and a high address for the code region;
(b) comparing an address for the instruction that has been fetched to the low address and the high address to determine if the address for the instruction is within a range bounded by the low address and the high address; and
if so, (c) determining that the instruction is within the code region, but if not, determining that the instruction that has been fetched is not within the code region.

10. The method of claim 8, wherein the selected event related to the profile information being collected for the code region is detected by:
(a) marking the selected event related to the profile information being collected, if the selected event is triggered by execution of the fetched instruction; and
(b) responding only to the selected event that is thus marked when updating the record.

11. The method of claim 10, further comprising setting a bit in the data cache when accessing each line of the memory block requested by the prefetching request to indicate that the line was used.

12. The method of claim 8, wherein the collected profile information is accumulated by one or more event counters to store the profile information while instructions that have been fetched and determined to be within the code region are being executed.

13. The method of claim 8, further comprising designating a subset of instructions in the code region as instructions for which the collected profile information will be collected, and marking results of executing the subset of instructions to indicate that the results were produced by executing the subset of instructions, the results including the selected event occurring due to execution of the subset of instructions.

14. A computing device to execute software and collect and produce profile information in regard to execution of instructions that are within a code region, comprising:

(a) a memory to store machine executable instructions; and
(b) a processor to execute the machine executable instructions stored in the memory, the machine executable instructions being executed by the processor to enable the profile information to be collected for the code region, the processor comprising:
(i) a first circuit to indicate whether an instruction that has been fetched by the processor is within the code region and, if so, to generate a do profile signal;
(ii) an event selector circuit to select an event for which to collect the profile information, and to generate an event occurred signal upon an occurrence of the selected event, the selected event being selected from synchronous events and asynchronous events, the event selector circuit further to enable the collection of profile information at a code region level of granularity and at least one of an interval and phase level of granularity;
(iii) a second circuit to generate an increment event signal in response to the event occurred signal when at least one of the do profile signal and a force profiling signal is asserted;
(iv) a third circuit to update the collected profile information in response to the increment event signal; and
(v) a prefetcher circuit to generate a prefetching request in response to the instruction that has been fetched, to store the prefetching request in a prefetch queue, and to store a prefetching profile bit in the prefetch queue along with the prefetching request when the do profile signal is asserted, wherein the prefetching profile bit is to be propagated with the prefetching request and stored in a data cache with each line of a memory block requested by the prefetching request to indicate that the line was prefetched in response to an instruction within the code region.

15. The computing device of claim 14, the machine executable instructions further being executed by the processor to set a bit in the data cache when accessing each line of the memory block requested by the prefetching request to indicate that the line was used.

16. The computing device of claim 14, wherein the processor comprises event recorders to store the collected profile information while instructions within the code region are being executed.

17. The computing device of claim 14, further comprising one or more event counters to store the collected profile information, wherein the processor resets the one or more event counters before collecting profile information related to execution of instructions within a new code region.

18. The computing device of claim 14, wherein the first circuit indicates whether machine executable instructions fetched by the processor are within any of a plurality of different code regions for which profile information is to be collected, the processor then marking each prefetching request generated in response to each fetched instruction that is within any of the plurality of different code regions with an identifier of the code region in which the machine executable instruction occurs.

* * * * *